United States Patent Office 3,214,407
Patented Oct. 26, 1965

3,214,407
METHOD OF MAKING POWDERED POLYCARBONATE
Richard Butterworth, Manor Township, Lancaster County, Pa., assignor to Armstrong Cork Company, Lancaster, Pa., a corporation of Pennsylvania
No Drawing. Filed Mar. 19, 1962, Ser. No. 180,868
6 Claims. (Cl. 260—47)

This invention relates generally to the making of powdered polycarbonates, and more particularly to the preparation of powdered poly (2,2-propane bis (4-phenyl carbonate)).

Polycarbonates are most frequently prepared by reacting 2,2-bis (4-hydroxyl phenyl) propane with phosgene or with other carbonating agents such as the lower alkyl carbonic acid esters, the aryl carbonic acid esters, and the alkyl haloformates. The reaction is usually carried out in a solvent for the starting bis-phenol and for the final polycarbonate. These solvents most usually comprise a chloromethane and often contain an acid acceptor such as pyridine to take up any hydrogen chloride released during the reaction.

The making of the polycarbonates in powdered form has always presented a problem. Mere distillation or similar removal of the solvent in which the polycarbonate has been prepared results in the formation of tough, horny masses which must then be reduced to a powder by some means. The mechanical grinding of these masses is quite difficult since the resulting particles appear to re-adhere under the forces of mechanical attrition, even when the grinding operation is carried out at a low temperature. Solution and precipitation processes have been proposed. These processes are operable, but they generally involved more expensive processing steps. In particular, the removal of some of the solvents from the powder has been difficult. For example, one of the proposed systems utilizes water, and it is difficult to remove the water from the subsequent powdered polycarbonate; extensive drying periods at elevated temperatures are required. In fact, the removal of most of the usable solvents is quite costly where the solvents are relatively high boilers.

It is the primary object of the present invention to supply a process of making powdered polycarbonates which overcomes these difficulties. It is a further object of the present invention to supply a process of making powdered polycarbonates where relatively low temperatures may be used to dry the resulting powdered polymer. It is still another object of the present invention to utilize simple and readily available equipment in the preparation of powdered polycarbonates.

These objects are achieved in a surprisingly straightforward and effective manner. The invention contemplates dissolving the polycarbonate in a liquid, chlorinated methane solvent therefor; this solution may result from the preparation of the polycarbonate itself. The process further contemplates precipitating the finely divided polycarbonate from the chlorinated methane solvent solution by adding to the solution an aliphatic ketone containing 4–7 carbon atoms. The resulting finely divided precipitated polycarbonate may readily be recovered from the resulting slurry by removal of the solvent and the ketone by filtration, followed by low temperature drying of the powdered polycarbonate in order to remove the last vestiges of the liquids.

The solvent which must be used in the present process will be a chlorinated methane, containing only carbon, hydrogen, and chlorine atoms, and preferably containing 2 or 3 chlorine atoms. It is one of the surprising features of the present invention that many other solvents for polycarbonates will not produce the powdered polycarbonate when the solution is treated with the ketone. Solvents succh as chlorobenzene, dioxane, 1,2,3-trichloro propane, and tetrahydrofurane do not allow the production of the desired powder. Some yield gels while others yield a tough intractable mass instead of a powder on ketone addition.

Sufficient of the chlorinated methane should be used to form a true solution of the polycarbonate in the solvent. Dilute solutions work since polycarbonate recovery is practically quantitative. A 10% solution of the polycarbonate in the chlorinated methane solvent is a good workable concentration, although concentrations in the range of about 0.5–50% by weight are operable so long as enough chlorinated methane is present to form a solution. The more dilute solutions toward the lower end of these limits may not be as practical since greater volumes of liquid must be handled. The solution is easily formed, preferably with gentle stirring. Warming, while not necessary, may hasten solution.

The ketone to be used as a precipitating agent must meet certain narrow requirements. The ketone must contain 4–7 carbon atoms; acetone does not work. Examples of usable ketones are methyl ethyl ketone (2 butanone), ethyl ethyl ketone (3 pentanone), methyl propyl ketone (2 pentanone), di-isopropyl ketone, and methyl isobutyl ketone.

The amount of the ketone to be added to the solution will vary from about 15% by volume of the ketone based on the volume of the solution up to 400% or 500% by volume. A preferable range is 150–200% by volume of the ketone based on the volume of the solution. The ketone is simply added to the solution with stirring. The precipitation does not immediately take place. Generally, the solution will remain clear immediately after the addition of the total amount of the ketone. After a few minutes, the solution becomes cloudy. The cloudiness increases until finally the precipitate settles out. As mentioned earlier, recovery of the powdered polycarbonate is substantially quantitative. Precipitation will always be complete after standing for 3 hours.

The preferred method of recovering the powdered carbonate is by simple filtration. The resulting powder may be dried in low temperature ovens, preferably air-circulating ovens, or it may in fact be dried simply by standing with turning at room temperature. In any case, the organic liquids used in the process are much easier to remove from the powder than water.

The resulting particles of powdered polycarbonate will be found to be quite small, on the order of 10 microns. Larger aggregates will occur in the powdered mass, but these aggregates are clumps measuring, perhaps, 100 microns in diameter composed of smaller particles of the powdered polycarbonate.

After the powdered polycarbonate has been removed, the mixture of ketone and chlorinated methane will preferably be distilled in order to separate the two constituents for reuse. Hence it will be advantageous to select one of the higher boiling ketones such as di-isopropyl ketone (boiling point 123° C.), or methyl butyl ketone (boiling point 127.2° C.), or methyl isobutyl ketone (boiling point 117° C.) to be used with a low boiling chlorinated methane such as methylene chloride, which boils at 40.2° C.

Felted sheets and woven cloth may be coated with the powdered polycarbonate, the system being subsequently heated with the application of pressure. Decorative doilies, tablecloths, and surface covering products result. Moisture-proof curtains in a wide variety of colors and patterns may be prepared since the powdered polycarbonate coats the fibers with a water-white, substantially inert coating.

The following examples illustrate several embodiments of the invention. All parts are by weight unless otherwise stated.

*Example 1*

A solution of a polycarbonate was prepared by passing phosgene into a mixture of 22 parts of sodium hydroxide, 335 parts of water, 60 parts of 2,2-bis (4-hydroxyl phenyl) propane, 599 parts of $CH_2Cl_2$, and 1 part dimethyl benzyl stearyl ammonium chloride. The phosgene was passed in for 162 minutes at the end of which time the mixture was acidic. In all, 29 parts of phosgene were used. The temperature was maintained at 86–88° F. by cooling during the entire period. The polymer solution was then washed twice with an equal volume of water.

To one volume of the methylene chloride solution of polycarbonate described above was added two volumes of methyl ethyl ketone. The mixture remained clear for 10 minutes and then became cloudy. At the end of 1 hour the polymer was filtered out and dried at 100° C. in an air-circulating oven. The fine white powder had a molecular weight of 110,000 as determined by the light scattering method in methylene chloride solution. The particles in the powder possessed a maximum diameter of 167 microns, an average diameter of 54 microns, and a minimum diameter of 10 microns. Photographs showed that the larger particles were conglomerates of smaller particles, the smaller particles having an actual particle size of about 10 microns.

The powder was sprinkled over the surface of a rubber bonded, water-laid asbestos sheet. The system was then subjected to pressure of about 2,000 pounds per square inch and a temperature of 375° F. The resulting product had an excellent optical appearance and was suitable for a covering for a counter top.

*Example 2*

A polycarbonate was prepared by reacting phosgene with 2,2-bis (4-hydroxyl phenyl) propane. The polycarbonate had a molecular weight of 56,000 as determined by the light scattering method.

A series of eight solutions was made, four having 10 parts of the polycarbonate dissolved in 130 parts of chloroform, and the four other solutions each having 10 parts of the polycarbonate dissolved in 130 parts of methylene chloride.

To each of the four chloroform solutions was added 150 parts (an equal amount by volume) of the following ketones, respectively: 2-butanone, 2-pentanone, 3-pentanone, and 2-isobutanone.

These same four ketones were added, 150 parts (equal volumes), respectively, to the four methylene chloride solutions.

In each instance, the solution became cloudy within 15 minutes, precipitation was complete within 2 hours, and after filtration and drying at 100° C., a solvent-free, easily flowable powdered polycarbonate resulted.

I claim:

1. A method of making powdered resinous poly(2,2-propane bis(4-phenyl carbonate)) which comprises dissolving said polycarbonate in a solvent therefor to form a solution containing 0.5–50% by weight of said polycarbonate, said solvent consisting essentially of a liquid chlorinated methane containing at least one hydrogen atom, precipitating the polycarbonate by adding to said solution an additive consisting essentially of an aliphatic ketone containing 4–7 carbon atoms in an amount of from 15–500% by volume based on the volume of said solution and thereafter recovering the precipitated powdered polycarbonate from the liquid medium.

2. The method according to claim 1 wherein said chlorinated methane solvent comprises chloroform.

3. The method according to claim 1 wherein said chlorinated methane solvent comprises methylene chloride.

4. The method according to claim 1 wherein said ketone comprises methyl ethyl ketone.

5. The method according to claim 1 wherein the solvent solution of polycarbonate contains about 10% by weight of the polycarbonate.

6. The method according to claim 1 wherein said ketone is added in an amount of about 150–200% by volume based on the weight of the solution of said polycarbonate in said solvent.

References Cited by the Examiner

UNITED STATES PATENTS 3,112,292  11/63  Bottenbruch et al. _____ 260—47 X

WILLIAM H. SHORT, *Primary Examiner.*

LOUISE P. QUAST, *Examiner.*